United States Patent Office 3,574,108
Patented Apr. 6, 1971

3,574,108
SOUND DEADENING METAL LAMINATE
Armand Francis Lewis, Fairfield, Conn., assignor to American Cyanamid Company, Stamford, Conn.
No Drawing. Continuation-in-part of abandoned application Ser. No. 506,439, Oct. 21, 1965, which is a continuation-in-part of abandoned application Ser. No. 449,791, Apr. 21, 1965. This application May 13, 1968, Ser. No. 728,780
Int. Cl. B32b 3/10; G10k 11/04
U.S. Cl. 161—113
10 Claims

ABSTRACT OF THE DISCLOSURE

Metal laminates comprising a thinner outer metal skin layer and a thicker perforated core layer bonded together with a polyurethane resin-based adhesive are disclosed. The core layer can be provided with a second outer metal layer. The core layer has a thickness of 5 to 1000 mils, the outer layers have a thickness of 1 to 100 mils, with the thickness ratio of the core layer to the outer layer being at least 4:1. The open area of the core layer can range from 40 to 70%; the perforations are substantially void of adhesive.

CROSS-REFERENCES TO RELATED APPLICATIONS

This application is a continuation-in-part of my copending application Ser. No. 506,439, filed Oct. 21, 1965, now abandoned, which in turn is a continuation-in-part of my application Ser. No. 449,791, filed Apr. 21, 1965 and now abandoned.

BACKGROUND OF THE INVENTION

Metal laminates are known in the art and have been the subject of numerous patents. Most laminates are satisfactory for many commercial uses but fail in at least one of four important categories, which are essential for commercial use, i.e. sound transmission loss, light weight, formability and structural integrity. That is to say, most commercial metal laminates do not sufficiently reduce sound transmission or absorb air-borne noise so as to allow their usage in, for example, chassis, mounts and enclosures for electronic equipment, engines and transmission systems and the like. Additionally, when they are made into such articles as sound-proof doors, etc. they are generally too heavy to be practical, especially for aircraft applications. Furthermore, present commercial laminates generally have too low a strength to weight ratio to be used in certain applications. Therefore, it becomes more commercially practical to utilize a single sheet of thinner but stronger expensive metal, i.e. stainless steel, rather than a laminate composed of a thin layer of stainless steel on a thicker layer of a cheaper metal, e.g. carbon steel. Additionally, many commercial metal laminates fail in practice because of their inability to be formed into various shapes without delaminating, i.e. the laminate fails when being deep drawn, welded, etc. into the configuration desired by the ultimate consumer.

SUMMARY

I have now found that new and novel metal to metal laminate structures can be prepared utilizing an outer layer of a thin metal, and a core layer of a thicker metal, with or without a third metal layer, without the accompanying undesirable features mentioned above. My laminates may be formed into intricate shapes such as 90° bends, 180° bends and Pexto elbow edges, etc. They may be fabricated, joined and post-formed, etc. by spot welding, seam welding, soldering, punching, riveting and tapping using conventional and commercially available special equipment.

Furthermore, they may be bent, deep drawn, joined, sawed and worked without delaminating much in the same manner as solid sheet metal. Additionally, my novel laminates have unique sound transmission loss properties as compared to readily available commercial laminates. They also are lighter in regard to their overall surface area and have a greater strength to weight ratio than solid core metal laminates.

My novel laminates are useful in such applications as architectural devices such as mullions, window tracks, window frames, elevator doors and panels, etc., automotive parts such as trim, dash panels, splash guards, tractor and truck bodies, household structures such as kitchen panels, closet doors, door frames and panels, bathroom panels, shower stalls and cabinets, furnace housings, garage doors, industrial articles such as ducts and exhaust hoods, corrosion resistant chambers, building panels, electronic equipment panels and chassis, instrument cabinets, wall plates and the like. Aerospace applications are also within the realm of applications for my laminates.

DESCRIPTION OF THE INVENTION INCLUDING PREFERRED EMBODIMENTS

My novel laminates, as mentioned briefly above, comprise (1) a surface metal having at least one of the following properties: desirable aesthetic appearance, corrosion resistance, mechanical strength or durability, (2) a thicker base metal which is perforated throughout its surface area and through its cross-sectional area and (3) a layer of cured adhesive which bonds the metal plies together.

I achieve my excellent results by the use of a combination of a perforated base metal layer and a polyurethane resin-based adhesive, a few of the more preferred of which are disclosed and claimed in various copending applications mentioned more fully hereinbelow, and a thinner skin metal layer. The use of such perforated layers and adhesives results in excellent laminates, the adhesive portion of which, is generally less than one percent of the total weight of the laminate.

Many types of metals may be utilized to produce my laminates with stainless steel or aluminum as the thin outer layer and perforated carbon steel or aluminum as the thicker base layer, being perferred. Other metals such as zinc, gold, galvanized carbon steel, aluminum coated carbon steel, magnesium, copper, brass, refractory metals such as titanium, lead, nickel, silver, nickel alloys and the like may also be utilized as the top layer or core layer of my novel laminates without departing from the scope of the present invention. Double layers of each metal may also be used, e.g. aluminum on aluminum. I may also utilize a perforated core metal having a thin metal adhered to both planar surfaces thereof and remain within the scope of the instant invention. Furthermore, if two thin metal outer layers are used, the layers may be of the same or a different metal.

As mentioned above, one of the unique features of my metal laminates, is the unsusual sound transmission loss charateristics thereof in combination with thin light weight. Their ability to reduce the transmission of acoustical energy is even more astounding when it is realized that my laminates have sound insulation values 10–25% better than solid metal sheets or solid base laminates. This quality is believed due to the fact that my laminates vibrate at a lower resonance frequency and acoustically there is a sudden drop-off of the noise spectrum at higher frequencies.

My laminates also possess the ability to be stored at 100° C. for over 6 months without delaminating, a factor which thus increases their commercial attractiveness, in that retail and wholesale outlets may maintain a sufficient supply of the laminates on hand. My products may also be used under cryogenic conditions because no delamination of fabricated structures of the laminate occurs at temperatures as low as −196° C.

The laminates of the instant invention are prepared by coating one or all sides of the metal layers to be bonded together with an adhesive, curing the adhesive, and placing the metal layers together under pressure to form the laminate. When a double laminate is produced, i.e. both sides of the core are covered with a skin metal, the composite must be subjected to pressure while it is still hot. During the curing step, the solvent in the adhesive is evaporated off at 70–120° C. and the adhesive is then cured at 110–160° C. for 2–3 minutes. The layers are then pressed together at 50–100 p.s.i. and post-cured at 140–150° C. for 8–16 hours. The adhesives may also be utilized as solvent free systems whereby no evaporation step is necessary before curing. My laminates can be produced both by a continuous method whereby rolls of metal are continually coated with adhesive and feed to evaporation (optional), curing and nipping zones or in a bulk method whereby the layers are individually coated with adhesive, such as by spraying, and subjected to heat and pressure consolidation. The only critical limitation present in applying the adhesive material is that the adhesive must not be allowed to clog or fill the perforations in the core metal, in that, filling of the perforations with the adhesive materially affects the properties of the resultant laminate. Therefore, the adhesive must be carefully used when applied to the core and it is hence, preferred to apply the adhesive to the foils and thus minimize the tendency for the adhesive to flow into the perforations while being cured. A minimal amount of adhesive may, however, be tolerated in the perforations, and, of course, excess adhesive may be removed from the perforations by merely scraping etc. the perforations after the adhesive is added. Alternatively, the adhesive may be advantageously placed a distance away from the perforations during the laminating step so that the pressure applied to the laminate does not cause the adhesive to flow into the perforations. Additionally, the perforations in the final laminate may or may not be evacuated.

The base core metal layer, as mentioned above, must be perforated in order to obtain the advantageous properties already set forth hereinabove. The perforations may be circular, square, slot-shaped, oval, rectangular, diamond star or random shaped holes, etc., no particular advantage or disadvantage being obtained by the use of any specifically shaped holes. The size of the perforation used is not critical, however, optimum results are achieved using certain size perforations. For example, if the laminate is to be used in architectural areas, it is preferred that the hole diameter be not greater than the thickness of the surface layer so that depressions of the surface metal into the holes will not form when bending pressure is applied to the laminate during forming, thereby marring too severely the appearance of the surface layer.

By the term "perforated metal" etc., as used herein, is meant any sheet of metal having perforations therein of the nature and type which can be produced by percussion, punching, punch-folding or drilling perforation techniques.

While the particular shape of the perforations in the base metal layer is not critical, I have now found that the percent open area of the metal core is critical and must range from about 25% to about 80% of the base metal in order to obtain optimum sound dampening results, preferably 40–70%.

As mentioned above, the perforation size is not critical, however, it is preferred that the perforations range in size from about 1/16" to about 3/4" at their shortest diameter i.e. that diameter of a circle incribed and touching a majority of the interior points of the particular perforation shape in question. It is also preferred that the ratio of the perforation diameter to the distance between the center of the perforations range from at least 0.5 to less than about 1.0.

The perforated core layer of my novel laminates may have a thickness ranging from about 5 to 1000 mils, preferably from 10–500 mils. However, the perforated core layer must be at least four times as thick as the foil, skin or surface metal layer which may range in thickness from about 1–250 mils, preferably from 2–125 mils. I have found that sound attenuation is appreciably reduced at ratios of less than about 4:1.

A preferred laminate, preferred in that it possesses optimum characteristics in regard to those desirable properties mentioned above, comprises an outer layer and core layer of aluminum or steel, an 8–15 mil thick outer layer, a 70–90 mil thick core layer of a 58–68% open area and a perforation diameter of about 3/32" to 3/16".

The adhesive layer should range in thickness from about 0.5 to 4 mils. Thicker layers are unnecessary and sometimes disadvantageous because of the difficulty in (1) fabricating thicker layer laminates without marring or indenting the surface and in (2) preventing the adhesive from filling the perforations of the core, but are not, however, to be excluded if necessary for some particular service application especially when a thermally and electrically insulating laminate is desired.

Among the adhesives which may be used to form the novel laminates of my invention are those specifically set forth and claimed in at least one of the following pending U.S. patent applications: Ser. No. 274,911, filed Apr. 23, 1963; Ser. No. 296,916, filed July 23, 1963 and Ser. No. 380,914, filed July 7, 1964 which applications are hereby incorporated herein by reference.

Briefly, these adhesives are composed of the following ingredients:

(A) A polyurethane resin, (B) A diamine curing agent, and (C) A diglycidyl ester, a diglycidyl ether, a monoethylenically unsaturated monoglycidyl ether, or a monoethylenically unsaturated monoglycidyl ester, or (D) As a substitute for, or in addition to (C), an aminosilane, or (E) As a substitute for (D) and in addition to (C), an epoxy silane, or (F) In addition to components (A), (B), (C) and (E), a polyethylenically unsaturated compound.

Among the polyurethane resins which may be utilized to prepare the adhesives used herein are the polyester or polyether based resins, although generally, any known polyurethane resin may be used. One class of polyurethane resins useful in preparing the adhesives used herein are the polyalkylene ether, thioether and ether-thioether glycols known in the art which have been reacted with a suitable isocyanate compound. These alkylene compounds may also be replaced by alkylene-arylene compounds also well known in the art.

A second class of polyurethane resins useful herein are those prepared from linear polyesters containing a plurality of isocyanate-reactive hydroxyl groups, such as those produced by condensing a polyhydric alcohol with a polycarboxylic acid or anhydride. U.S. Patent Nos. 2,729,618 and 3,016,346 teach examples of various polyurethanes which may be used as components in the resins used herein and also procedures for the production thereof, said patents being incorporated herein by reference.

A polyurethane resin system which has been found to be exceptionally useful is composed of a polyester of adipic acid and ethylene glycol which has been reacted with methylene diphenyl isocyanate. The resultant product is then further reacted with 1,4-butanediol. When polyurethane resins of this type are utilized, no curing agent need be employed.

The polyurethane may need to be cured, however, in order to give the optimum results. If such curing is necessary, curing agents must be used, such compounds as 4,4′-diamino-diphenylmethane, 4,4′ - methylene-bis-2-orthochloroaniline and the like being exemplary. Ranges of from 0%–200%, preferably 20–160%, of the stoichiometric equivalent of the polyurethane should be used.

The diglycidyl ethers or esters and the monoethylenically unsaturated monoglycidyl ethers or esters useful as components of the adhesives used herein include glycidyl methacrylate, glycidyl acrylate, allyl glycidyl ether, diglycidyl phthalate, glycidyl benzyl acrylamide, the diglycidyl ether of 2,2-bis(p-hydroxyphenyl) propane and the like, in amounts ranging from 1:2 parts to about 1:16 parts of the esters or ethers to the polyurethanes, respectively.

In place of the glycidyl esters and ethers, I may use an aminosilane such as gamma-aminopropyl-triethoxysilane, delta-aminobutyldiethoxy silane and the like in concentrations ranging from about 0.1% to about 4.0%, by weight, based on the weight of the polyurethane resin.

Furthermore, if the glycidyl ester or ether is utilized, I may use, in addition thereto, an epoxy silane, such as gamma-glycidoxypropyltrimethoxysilane in amounts ranging from 0.1% to 10.0%, by weight, based on the total weight of the adhesive per se.

An additional component which may be used in combination with the polyurethane resin, the amine curing agent, the glycidyl ester or ether and the epoxy silane, comprises a polyethylenically unsaturated compound such as tetrallyl melamine, trimethylolpropanetrimethacrylate, divinyl benzene, triallylphosphate, triallylamine, ethylene glycol dimethacrylate, diallyl-phthalate, 1,4-di(vinyloxy) butane and the like in concentrations of up to about 20%, by weight, based on the total weight of the composition per se.

Before applying the adhesive to the metal, the metal should preferably be chemically clean. This may be achieved by working the metal with hot aqueous alkali or acid solution. The adhesive is preferably used as a 40–50% solution in a solvent such as methyl ethyl ketone and may be applied to the metal by brushing, roller coating, curtain coating or spraying techniques and the like.

The following examples are set forth for purposes of illustration only and are not to be construed as limitations on the present invention except as set forth in the appended claims. All parts and percentages are by weight unless otherwise indicated.

Example 1

To three parts of glycidyl methacrylate are added one part of finely pulverized 3,3'-methylenebisortho-chloroaniline and 0.35 part of gamma-glycidoxy-propyl-trimethoxysilane in a suitable vessel. The vessel is warmed to 70° C. to dissolve the ingredients and then cooled to room temperature. To the resultant mixture are then added 12 parts of a polyester (90/60 ethyleneglycol/propyleneglycol adipate) based commercially available polyurethane resin (polyester reacted with 3,3'-dimethyl-4,4'-biphenylene diisocyanate) and 0.01 part of 2,5-dimethyl-2,5-di(t-butylperoxy)n-hexane as a catalyst with stirring. The resultant composition is blended into a smooth paste with the addition of 200 parts of methyl ethyl ketone and is applied to a panel 10⅛ inches by 10⅛ inches, perforated to a 63% open area with $\frac{5}{32}$ inch circular holes, $\frac{3}{16}$″ center to center, and 0.080″ in thickness, care being taken not to fill the perforations with the adhesive by applying the adhesive a distance away from the perforations. The same composition is then similarly applied to two similarly dimensioned sheets of aluminum, 0.012″ in thickness. The three sheets are heated to 95° C. to evaporate off the methyl ethyl ketone and 145° C. to cure the adhesive. The sheets are then nipped together, the adhesive sides of the thinner sheets being in contact with the adhesive sides of the thicker sheet, to produce a laminated structure.

The resultant metal laminate is then subjected to tests in order to obtain the sound transmission loss properties thereof. Various other metal laminates are also prepared according to Example 1, except that the perforations are allowed to become filled with adhesive. These results are shown in Table 1, below.

The acoustical transmission loss measurements involved testing the 10⅛″ x 10⅛″ panels by placing them between a sound source box (12″ x 12′ x 48″) and a receiver box (12″ x 12′ x 48″). This 10$\frac{5}{16}$ x 10$\frac{5}{16}$″ x 8′ (inner dimensions) one inch thick wooden (maple) box is known acoustically as an impedance tube. In the sound source half of the tube, ½″ thick furring strips were placed at one end and the samples were bolted in position with a wooden clamp arrangement. The samples were well caulked into place to form an airtight seal. At the other end of this section, a two cone loudspeaker mounted in an infinite baffle was affixed to an 8″ diameter opening at the end opposite (and normal to) the mounted sample. The sound source half of the tube was also lined with lead ($\frac{1}{32}$″ thick) to minimize sound leakages. In the receiver half of the tube, a precision ceramic microphone was mounted. In order to make the measurements, the ends of the sound source box (containing the test sample) and the receiver box were first coated with caulking compound. The coated ends were then butted together and secured with high transmission loss pressure sensitive tape.

During the measurements, the loudspeaker was excited using a random ("white") noise generator set at a kHz. bandwidth. The noise level was adjusted to a 0.41 volts (RMS) output to drive a high fidelity amplifier. The sound transmitted through the test panel was analyzed with the precision microphone at octave band intervals with center frequencies corresponding to 16, 8, 4, 2, 1, 0.5, 0.25, 0.125, 0.063 kHz. using Octave-Band Noise Analyzer. With the sound source level adjusted to a full spectrum level of 110 db, the sound levels in the receiver box were measured at the various octave band intervals.

TABLE 1

| Example | Laminate system | Noise reduction Frequency, Hz, octave band center | Decibel loss, db | Average transmission loss=db | Areal density, AD=lbs./ft.² | db/AD, db/lb./ft.² |
|---|---|---|---|---|---|---|
| 1 | That of Example 1 | 1,000<br>500<br>250<br>125<br>63 | 30.0<br>30.0<br>20.5<br>42.5<br>39.5 | 32.4 | 0.772 | 42 |
| 2, composition | That of Example 1 except perforations filled with adhesive. | 1,000<br>500<br>250<br>125<br>63 | 33.5<br>32.5<br>21.5<br>40.5<br>26.0 | 30.8 | 0.968 | 32 |
| 3 | Same as Example 1 except only one thin sheet applied to perforated sheet. | 1,000<br>500<br>250<br>125<br>63 | 29.0<br>29.5<br>29.5<br>32.0<br>26.0 | 29.2 | 0.605 | 48 |
| 4, composition | Same as Example 3 except perforations filled with adhesive. | 1,000<br>500<br>250<br>125<br>63 | 32.0<br>36.5<br>23.5<br>29.5<br>25.5 | 29.4 | 0.910 | 32 |

EXAMPLE 5-8

Following the procedure of Example 1, except that various other prior art non-polyurethane adhesives are substituted for the adhesive therein, various laminates are produced. Example 8 represents the laminates of the instant invention with the same adhesive of Example 1. The laminates are subjected to known fabrication tests to determine their formability. The results are set forth below in Table II.

TABLE III.—BROADBAND SOUND TRANSMISSION LOSSES THROUGH SAMPLES FOR BROADBAND RANDOM NOISE WITH A GAUSSIAN FREQUENCY DISTRIBUTION

| Example | Sample | Value, (db-loss) |
|---|---|---|
| 9 | .010″ stainless steel on both sides of .08″ carbon steel perforated with .108″ dia. circular holes —41% open area. | 20.5 |
| 10 | .010″ stainless steel on .08″ carbon steel perforated with .108″ dia. circular holes —41% open area—closed side toward sound source. | 18.5 |
| 11 | .010″ stainless steel on .08″ carbon steel perforated with .108″ dia. circular holes —41% open area—open side toward sound source. | 18 |

TABLE II

| | Metals Used [1] | Peel Strength, (p.p.i.) | Adhesive | Tests of Fabrication | Results |
|---|---|---|---|---|---|
| Example: | | | | | |
| 5 | 0.008″ stainless steel on 0.032″ carbon steel core. | 5 | Phenoxy resin.[2] | 180° bend; 90° bend; Pexto Elbow; Edge Pittsburg Lock Seam. | F PT F F |
| 6 | do | 10 | Nitrile rubber and poly(vinyl chloride) film.[3] | do | F F F F |
| 7 | do | 20 | Nitrile-phenolic adhesive. | do | F PT F F |
| 8 | do | 60 | Adhesive of Example 1. | do | P P P P |

[1] All core metals were perforated to 53% open area with 0.041″ diameter circular holes.
[2] T.E. Bugel et al., ASTM, STP-360, pg. 87, 1963.
[3] British Patent No. 951,266.

NOTE.—Code for Table II:
F=failed.
P=passed.
PT=passed but bent areas show marring of surface.

Various other laminates of the instant invention were then tested for Sound Transmission. The results are set forth in the following Table III.

The samples were evaluated by clamping (10¼″ x 10¼″) pieces in the center of a 10¼″ x 10¼″ x 8′ oak box mounted on a ten (10) ton isolated reinforced concrete base. Two microphones, calibrated to the same decibel (2 ×10⁻⁴ dynes per square centimeter) level were positioned at quarter points of the box so as to straddle the test specimen. The noise generator consisted of a speaker mounted in the end plate of the chamber, a random noise generator, and an amplifier.

Various other metal laminates were then produced and tested according to Example 1 and the testing method of Table I, except that the open area, hole size, hole center to center distance and metals were varied according to the instant invention. The results are set forth in Table IV, below.

TABLE IV

| Example | Laminate system | Average transmission loss=db [1] | Areal density, (lbs./ft.²) | db/AD- db/lb./ft.² | Ratio of hole size to distance between hole center |
|---|---|---|---|---|---|
| 12 | 0.012″ carbon steel on both sides of 0.080″ perforated carbon steel—0.156″ diameter holes—3/16″ center to center—63% open area. | 32.5 | 2.12 | 15.3 | .825 |
| 13 | 0.012″ carbon steel on both sides of 0.063″ perforated carbon steel—0.5″ diameter holes—1 1/16″ center to center—47% open area. | 28.2 | 2.23 | 12.6 | .710 |
| 14 | 0.012″ carbon steel on both sides of 0.063″ perforated carbon steel—0.19″ diameter holes—5/16″ center to center—52% open area. | 29.1 | 2.52 | 11.5 | .600 |
| 15 | Same system as Example 12, but 5/16″ center to center and 23% open area. | 32.2 | 3.71 | 8.7 | .498 |
| 16 | Same system as Example 12, but .453 on side—½″ center to center, square perforations—80% open area. | 29.0 | 1.70 | 17.0 | .907 |

[1] See Table I.

The procedure for each sample involved adjusting the noise generator and amplifier to provide an overall broadband reading of 106 decibels. The two microphones were positioned in the center of the chamber and the chamber was closed. The broadband difference due to the interference of the sample was then noted.

Another series of metal laminates were prepared according to Example 1 except that the ratio of the thickness of the perforated metal core to the thin outer metal layer was varied. The results are set forth in the following Table V.

TABLE V

| Example | Laminate system | Average transmission [1] loss 37.5 to 9,600 Hz., db | Areal density, lbs./ft.[2] | db/AD db/lbs./ft. |
|---|---|---|---|---|
| 17 | 0.012" aluminum on both sides of 0.080" perforated aluminum 0.156" hole diameter 3/16" center to center—63% open area. | 30 | 0.77 | 42 |
| 18 | Same core as in Example 17, but with 0.025" aluminum on both sides. | 31 | 1.2 | 25.8 |

[1] Tests conducted on 3' x 7' panels as in Table I test except that sound source and receiver chamber were large walk-in reverberant rooms.

I claim:
1. A metal laminate comprising a perforated metal base layer having a thickness of from about 5 to about 1000 mils and having bonded to each major surface thereof at least one imperforate outer metal layer having a thickness of from about 1 to about 100 mils, the layers being bonded together with a polyurethane resin-based adhesive, the thickness ratio of said base layer to each of said outer layers being at least about 4:1, respectively, the open area of said base layer ranging from about 40% to about 70%, the perforations in said base layer being substantially void of adhesive.
2. A metal laminate according to claim 1, the layers being bonded together with an adhesive selected from the group consisting of
   (a) those comprising a mixture of
       (1) a polyurethane resin
       (2) from about 0% to 200% of the stoichometric equivalent of said polyurethane, of a diamine curing agent and
       (3) a compound selected from the group consisting of a diglycidyl ester, a diglycidyl ether, a monoethylenically unsaturated monoglycidyl ether and a monoethyleically unsaturated monoglycidyl ester, in amounts ranging from about 1:2 to about 1:16 parts of said compound to said polyurethane respectively;
   (b) those comprising a mixture of
       (1) a polyurethane resin
       (2) from about 0% to 200% of the stoichometric equivalent of said polyurethane, of a diamine curing agent and
       (3) from about 0.1% to about 4.0%, by weight, based on the weight of the polyurethane resin, of a aminosilane;
   (c) those comprising a mixture of
       (1) a polyurethane resin
       (2) from about 0% to 200% of the stoichiometric equivalent of said polyurethane, of a diamine curing agent
       (3) a compound selected from the group consisting of a diglycidyl ester, a diglycidyl ether, a monoethylenically unsaturated monoglycidyl ether and a monoethylenically unsaturated monoglycidyl ester, in amounts rangnig from about 1:2 to about 1:16 parts of said compound to said polyurethane, respectively, and
       (4) from about 0.1% to about 4.0%, by weight, based on the weight of the polyurethane resin, of an aminosilane;
   (d) those comprising a mixture of
       (1) a polyurethane resin
       (2) from about 0% to 200% of the stoichiometric equivalent of said polyurethane, of a diamine curing agent and
       (3) a compound selected from the group consisting of a diglycidyl ester, a diglycidyl ether, a monoethylenically unsaturated monoglycidyl ether and a monoethylenically unsaturated monoglycidyl ester, in amounts ranging from about 1:2 to about 1:16 parts of said compound to said polyurethane, respectively, and
       (4) from about 0.1% to 10%, by weight, based on the total weight of the composition, of an epoxy silane and
   (e) those comprising a mixture of
       (1) a polyurethane resin
       (2) from about 0% to 200% of the stoichiometric equivalent of said polyurethane, of a diamine curing agent and
       (3) a compound selected from the group consisting of a diglycidyl ester, a diglycidyl ether, a monoethylenically unsaturated monoglycidyl ether and a monoethylenically unsaturated monoglycidyl ester, in amounts ranging from about 1:2 to about 1:16 parts of said compound to said polyurethane, respectively,
       (4) from about 1.0% to 10%, by weight, based on the total weight of the composition, of an epoxy silane and
       (5) up to about 20%, by weight, based on the total weight of the composition, of a polyethylenically unsaturated compound.
3. A metal laminate according to claim 2 wherein (3) is glycidyl methacrylate.
4. A metal laminate according to claim 1, wherein said outer layers are stainless steel and said base layer is carbon steel.
5. A metal laminate according to claim 2, wherein said outer layers are stainles steel and said base layer is carbon steel.
6. A metal laminate according to claim 1, wherein said outer layers are stainless steel and said base layer is aluminum.
7. A metal laminate according to claim 2, wherein said outer layers are stainless steel and said base layer is aluminum.
8. A metal laminate according to claim 1, wherein said outer layers and said base layer are aluminum.
9. A metal laminate according to claim 2, wherein said outer layers are stainless steel and said base layer is aluminum.
10. A metal laminate according to claim 1, wherein said outer layers and said base layer are carbon steel.

References Cited

UNITED STATES PATENTS

| 2,237,623 | 4/1941 | Ledwinka | 181—33 |
| 3,309,261 | 3/1967 | Schiller et al. | 161—190 |

ROBERT F. BURNETT, Primary Examiner

R. H. CRISS, Assistant Examiner

U.S. Cl. X.R.

161—190, 213, 165; 181—33